S. SENSTIUS.
ALTERNATING CURRENT MACHINE.
APPLICATION FILED APR. 11, 1908.
1,055,362.
Patented Mar. 11, 1913.
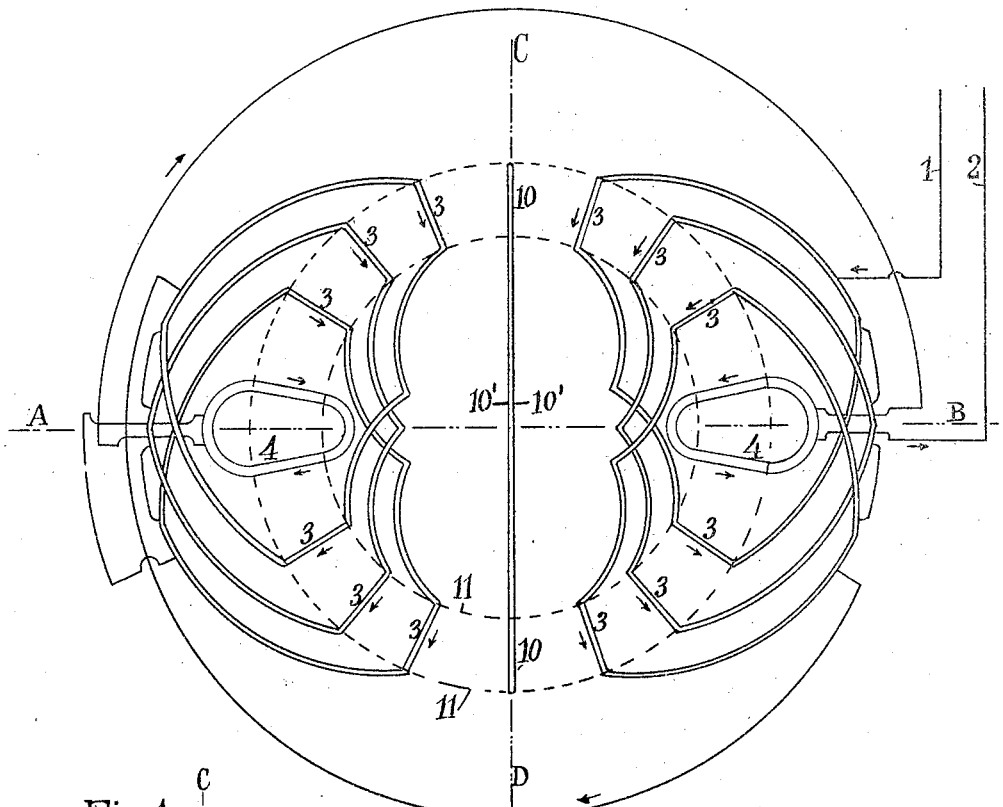
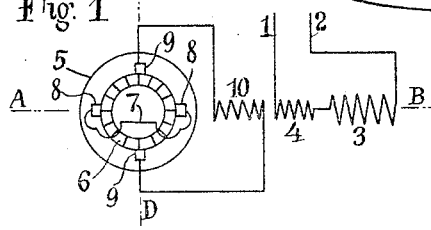
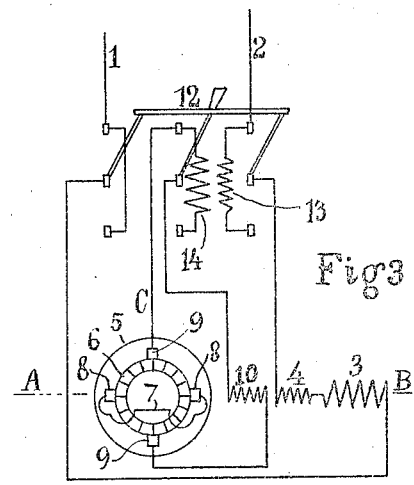
Witnesses.
Inventor
Sebastiaan Senstius
By his Attorneys
Edwards, Sager & Wooster

UNITED STATES PATENT OFFICE.

SEBASTIAAN SENSTIUS, OF CINCINNATI, OHIO, ASSIGNOR TO THE TRIUMPH ELECTRIC COMPANY, A CORPORATION OF OHIO.

ALTERNATING-CURRENT MACHINE.

1,055,362.

Specification of Letters Patent. Patented Mar. 11, 1913.

Application filed April 11, 1908. Serial No. 426,465.

*To all whom it may concern:*

Be it known that I, SEBASTIAAN SENSTIUS, a subject of the Queen of the Netherlands, residing at Cincinnati, in the county of Hamilton and State of Ohio, have invented certain new and useful Improvements in Alternating-Current Machines, of which the following is a full, clear, and exact specification.

My invention relates particularly to the general type of alternating current machines, which when used as motors are known as compensated repulsion motors, series and shunt. A motor of the latter type is provided with a stator having a distributed single phase winding and the rotor is of the direct current armature type having short circuited brushes bearing on the commutator in the magnetic line of the single phase stator winding. Exciting brushes also bear upon the commutator displaced 90 degrees from the short circuited brushes, the exciting brushes being connected across the terminals of a single phase stator winding. Such a motor has the advantage of working at or near synchronism with unity power factor, but it is not however, self starting. The motor can be started either as a series repulsion motor or as a compensated series repulsion motor. The compensated shunt repulsion motor has not yet become a commercial type of motor owing to the difficulties experienced with excessive sparking at the brushes under normal operating conditions. The sparking takes place not so much below the exciter brushes as below the short circuited brushes. With the usual type of repulsion motor, it has been found necessary to either design the rotor winding for very low voltages or to insert resistances between the rotor coil terminals and the commutator segments in an endeavor to avoid sparking. The first method involves the handling of large currents and thus requires a large and excessive commutator with large brushes and which results in poor efficiency. The second method is also very objectionable by reason of the poor efficiency, expensive windings and large amount of heat in the armature which has to be dissipated.

One object of my invention is the production of motors of these types which will overcome the above difficulties, and other objects and advantages will be understood from the following description.

In order to more fully understand my invention, I will first briefly describe the actions occurring in the operation of the compensated shunt repulsion motor. At or near synchronism, the reactance between the exciter brushes is zero, and the excitation current carried by such brushes is in phase with the electromotive force of the line. The excitation current creates an excitation or motor field which is in phase with the exciting current, and therefore this field is in phase with the electromotive force of the line, but the magnetic axis of such field is displaced 90 degrees from the magnetic axis of the stator winding owing to the displaced position of the exciter brushes. The rotation of the armature through this excitation or motor field generates a speed electromotive force in line with the short circuited brushes as in the direct current machine, and this generated electromotive force is in phase with the motor field, and, consequently, in phase with the line electromotive force. The short circuiting connection of the short circuited brushes causes this generated speed electromotive force to produce an excitation current differing in phase 90 degrees therefrom, and the resulting flux or speed field is in phase with the short circuit excitation current, and its magnetic axis is in the same axial line as the magnetic axis of the stator windings. This magnetic field resulting from the excitation current through the short circuited brushes induces by transformer action an electromotive force in the single phase stator winding. This induced electromotive force lags 90 degrees behind the field created by the excitation current through the short circuited brushes, and consequently, this induced electromotive force lags 180 degrees behind the line electromotive force, that is, it opposes the line electromotive force. This induced electromotive force which may be termed the speed electromotive force of transformation, may also be called the counter electromotive force of the motor, and at no load it equals the line electromotive force. At synchronism, the speed field, that is, the field created by the excitation current through the short circuited brushes, equals the motor field, which is the field created by the current through the exciter brushes, and a revolving field is thus created; that is, the fields created are displaced 90 degrees from each other and differ in phase by 90 degrees. As the load increases on the motor, the speed becomes less which causes the above mentioned speed electromotive force and the counter electromotive force to decrease. The difference between the electromotive force of the line and the counter electromotive force causes a current to flow through the stator winding and the magneto motive force of this winding is then compensated by an equivalent armature magneto motive force in magnetic line with the short circuited brushes. Such in brief is the action of a compensated shunt repulsion motor, although it will be understood that where I have referred to the various relations, it will be understood that they are only approximately or generally stated.

While the excitation brushes only carry a practically constant excitation current, the short circuited brushes carry the same amount of excitation current plus a variable flow of current depending upon the load. With more particular reference to the commutation at the short circuited brushes where sparking is excessive, it will be seen that there are three electromotive forces present in the coils short circuited under such brushes:—first, the transformer electromotive force induced by the transformer action of the motor field upon such short circuited coils; second, the speed electromotive force generated by the movement of such coils through the above referred to speed field; third, the commutation electromotive force which is similar to that in direct current machines and is equal to the self induced electromotive force of the commutated current, and which latter current is the vector sum of the rotor current compensating the load current and the excitation current of the speed field. The first or transformer electromotive force lags 90 degrees in phase from the motor field or field created by the excitation current passing through the exciter brushes, and thus is in phase with the speed field or field created by the current through the short circuited brushes. The second electromotive force, or that generated by the movement of such coils through the speed field, is in phase with the speed field, and thus in phase with the first or transformer electromotive force, but is opposed thereto. At synchronism the two are equal, because at that speed the motor field equals the speed field, both producing a field revolving with the same speed as the rotor conductors. Below synchronism the transformer electromotive force is the larger, whereas above synchronism it is the smaller of the two. Generally speaking, however, near synchronism their difference will not produce objectionable sparking. The resulting electromotive force in both cases could be annulled by a speed electromotive force generated by the movement of the coils through a field lagging behind the line pressure in the first case, and leading in the second case. The third or commutation electomotive force can be annulled by a speed electromotive force generated by movement of the coils through a field which is in phase with the commutation current.

By my invention I secure over-compensation, and thereby eliminate or reduce sparking to a degree which is not objectionable. I secure this over-compensation in the region of commutation, and although the effective stator magneto motive force equals the effective rotor magneto motive force, yet there may be points of under-compensation and other points of over-compensation, and according to my invention these points of over-compensation are located in the region of commutation. The brushes are given such a position that commutation takes place under or near one or more teeth of the stator. Upon such tooth or teeth, I place a coil having a magneto motive force, which, in addition to the stator magneto motive force, produces over-compensation under or near said tooth or teeth. One way of securing this result is to connect the over-compensating coils between the otherwise short circuited brushes and thus cause the rotor current to pass through the over-compensating coils. Such an arrangement has the advantage that the commutation electromotive force becomes zero for any speed. When the slip is small, such a connection will secure satisfactory relation. However, for speeds markedly above or below synchronism, it is preferable to connect the over-compensating coil or coils in series with the stator winding and design the motor to take leading currents above synchronism and lagging currents below synchronism, such design being understood by those skilled in the art. Under such conditions, the over compensating speed electromotive force generated in the commutated coil or coils acts when below synchronism against the predominating transformer electromotive force, and when above synchronism against the predominating speed electromotive force.

My invention will be better understood by reference to the accompanying drawings and description taken in connection with the above explanation.

Figure 1 is a diagram showing the circuits of a compensated shunt repulsion motor and having the over-compensating coil or coils connected in series with the stator winding; Fig. 2 is a diagram showing a development of the stator windings; and Fig. 3 is a diagram showing connections similar to Fig. 1, and additional means for starting the motor.

Referring to Fig. 1, the two alternating current supply mains are indicated at 1, 2, and the usual single phase stator winding is shown at 3 connected to the supply mains. In series with the stator winding 3 is shown the over-compensating winding 4, which is also located on the stator and incloses the tooth or teeth as above referred to for securing over-compensation at the points of commutation. The rotor having a winding of the direct current type is indicated at 5 and is provided with the usual commutator 6. The short circuited brushes are shown as connected by a connection 7, the brushes being indicated at 8, 8. The exciter brushes 9, 9 are shown as bearing on the commutator displaced 90 degrees from the short circuited brushes. Connected between the exciter brushes 9, 9 is a secondary exciter winding 10. It will be noted that the magnetic axis of the stator winding 3, over-compensating winding 4 and secondary exciter winding 10 are all located with their magnetic axis in approximately the same axial line A, B. Also the short circuited brushes 8, 8 are located in the same axial line A, B. The exciter brushes 9, 9 are located in the axial line C, D, displaced 90 degrees electrically from the line A, B. The secondary exciter winding 10 is indicated in Fig. 1 as located on the stator and subjected to the flux of the usual stator winding 3.

Referring to Fig. 2, the slots or openings in which the stator winding are embedded extend in the development between the dotted lines 11, 11, the connections within the inner line 11 and without the outer line 11, representing the end connections and leads. The usual stator winding is shown in Fig. 2 as a distributed winding and designated by the character 3. This winding is indicated as coils applied to the stator and connected in series with each other in the usual manner, and in series between the supply mains 1, 2, the arrows indicating the direction of the current through the windings when the supply current flows in one direction, and will, of course, be in the opposite direction when the current from the supply mains reverses. It will be noted that the magnetic axis of the stator winding 3 is in the direction A, B as in Fig. 1. The over-compensating windings are shown in Fig. 2, at 4, 4 and enveloping teeth of the stator within the coils of the stator winding 3, and it will be noted that the over-compensating coils are shown heavier than the coils 3 for the purpose of indicating that the over-compensating coils have a greater number of turns and thereby produce a magneto-motive force of sufficient strength to secure the over-compensation at the points of commutation. It will be understood that the coils 4 may envelop a greater or less amount of the stator than indicated in Fig. 2, and instead of comprising one coil at each point of commutation may be subdivided into a plurality of coils. The coils 4 are shown in Fig. 2 as connected in series with the supply mains 1, 2 and in series with the stator winding 3, the magnetic axes of the coils 4 being on the line A, B. Although the rotor is omitted from Fig. 2 for the sake of clearness, yet it will be understood that the short circuited brushes 8, 8 are located approximately in the line A, B, and therefore cause the commutation of the coils of the rotor under the brushes 8, 8 to be subjected to the field of the over-compensating coils 4 for reducing the sparking of these brushes to a minimum. The secondary winding 10 which is connected to the exciter brushes 9, 9, is shown in Fig. 2 as a coil located in slots approximately on the line C, D, the oppositely located conductors in the stator slots being connected in series with each other, and the terminals of the coil indicated at 10', 10' will be connected to the exciter brushes 9, 9. The coil 10 will thus have its magnetic axis coinciding with the line A, B, and with the magnetic axis of the stator winding 3. The slots for winding 10 may be located in any suitable manner as long as the magnetic axis of said coils are in the direction A, B, approximately.

A motor of the type shown may be started by shifting the short circuited brushes 8, 8 out of line with the magnetic axis A, B in either direction depending upon the direction of rotation desired. The circuit from the supply mains is then closed and the motor starts as a repulsion motor. Near synchronism, the brushes are returned to their normal position. In Fig. 3, I have indicated a method and means for starting. The starting switch 12 is shown as a triple pole double throw switch. A series transformer is indicated in Fig. 3 having the primary winding 13 and the secondary winding 14, and is provided for starting the motor and bringing the same up to speed. The connections are as shown in Fig. 3. When the switch 12 is thrown to the lower position, it will be seen that the primary winding 13 of the series transformer is connected in series with the supply main 2, and the secondary 14 is connected in series with the exciter brushes 9, 9 and winding 10. The line 1 is connected in this starting position to the stator winding in the usual manner. The motor then starts as a compensated series repulsion motor gradually changing its characteristics as the speed increases, and becoming a compound motor at the higher speeds, because the shunt field increases with increasing speed to a maximum at synchronism. After the motor has attained proper speed, the switch 12 is thrown to its upper position which cuts the transformer windings 13, 14 out of circuit and the motor then operates as a compensated shunt repulsion motor. The connections of Fig. 3 are otherwise the same as those shown in Fig. 1.

It will be understood that my invention may be applied to alternating current machines, other than the compensated shunt repulsion motor. For example, it may be applied to shunt and series repulsion motors or to self excited single phase generators which are machines of the compensated shunt or compound repulsion motor type. These single-phase motors have the common characteristic of possessing a revolving field, though excited by single phase currents. It will also be understood that various modifications of my invention may be made without departing from the scope thereof.

Having thus described my invention, I declare that what I claim as new and desire to secure by Letters Patent, is,—

The combination with a motor having a stator carrying a main stator winding, an over-compensating winding and a secondary exciter winding, said windings being in magnetic axial alinement, and a rotor having a commutated winding of the direct current type, of brushes bearing upon said commutator in alinement with the magnetic axis of said stator windings, said brushes being connected together, brushes bearing upon said commutator at points removed 90 electrical degrees from the aforesaid brushes, a triple pole double-throw switch having its movable member pivoted to its middle contacts, a transformer having the extremities of its primary connected between the two outside contacts at one end of the switch and its secondary connected between the two outside middle contacts of said switch, a source of alternating current having one terminal connected with one terminal of the primary of said transformer and the other terminal of said source being connected to the two outside contacts at the other end of said switch, said secondary exciter winding having its terminals respectively connected with a brush 90° removed from the magnetic axis of said stator windings and to the middle contact of the middle row of said switch, the outside middle contact upon the same side as the terminals of said source being connected with a brush 90° removed from the magnetic axis of said stator windings, and said main and over-compensating windings being connected in series between the middle contacts at the ends of said switch.

In testimony whereof I affix my signature, in presence of two witnesses.

SEBASTIAAN SENSTIUS.

Witnesses:
 EDW. MOULINIER,
 OCIA SHINDELDECKER.